(12) United States Patent
Ajisaka

(10) Patent No.: US 10,259,309 B2
(45) Date of Patent: Apr. 16, 2019

(54) VEHICLE UNDERFLOOR STRUCTURE

(71) Applicant: TOYOTA JIDOSHA KABUSHIKI KAISHA, Toyota-shi, Aichi-ken (JP)

(72) Inventor: Satoshi Ajisaka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/033,558

(22) Filed: Jul. 12, 2018

(65) Prior Publication Data
US 2019/0031013 A1    Jan. 31, 2019

(30) Foreign Application Priority Data
Jul. 25, 2017  (JP) .................................. 2017-143691

(51) Int. Cl.
| | | |
|---|---|---|
| *B60K 6/40* | (2007.10) | |
| *B60K 1/04* | (2019.01) | |
| *B60K 15/063* | (2006.01) | |
| *B60K 6/48* | (2007.10) | |

(52) U.S. Cl.
CPC .................. *B60K 6/40* (2013.01); *B60K 1/04* (2013.01); *B60K 6/48* (2013.01); *B60K 15/063* (2013.01); *B60K 2001/0422* (2013.01); *B60K 2001/0438* (2013.01); *B60K 2015/0633* (2013.01); *B60K 2015/0634* (2013.01); *B60Y 2200/92* (2013.01)

(58) Field of Classification Search
CPC ... B60K 6/40; B60K 6/48; B60K 1/04; B60K 15/063; B60K 2001/0438; B60K 2001/0422; B60K 2015/0633; B60K 2015/0634; B60Y 2200/92
USPC .......................................................... 180/68.5
See application file for complete search history.

(56) References Cited

U.S. PATENT DOCUMENTS

| | | | |
|---|---|---|---|
| 8,393,426 B2 * | 3/2013 | Takahashi | B60K 1/04 180/68.5 |
| 8,887,695 B2 * | 11/2014 | Aso | F02M 25/0854 123/518 |
| 9,985,258 B2 * | 5/2018 | Hara | H01M 2/1077 |
| 2017/0106744 A1 | 4/2017 | Ajisaka | |

FOREIGN PATENT DOCUMENTS

| | | |
|---|---|---|
| JP | H09-076774 A | 3/1997 |
| JP | 2011-126439 A | 6/2011 |
| JP | 2014-19260 A | 2/2014 |
| JP | 2017-077781 A | 4/2017 |

* cited by examiner

*Primary Examiner* — John D Walters
(74) *Attorney, Agent, or Firm* — Oliff PLC

(57) ABSTRACT

A vehicle underfloor structure has: a battery pack that is disposed beneath a floor of a vehicle, and that is a power source that drives a motor for traveling that is installed in the vehicle; and a fuel tank that is disposed beneath the floor of the vehicle, and between a vehicle body front side end portion and a vehicle body rear side end portion of the battery pack as seen in a side view, and between vehicle transverse direction both end portions of the battery pack as seen in a plan view.

14 Claims, 8 Drawing Sheets

VEHICLE UNDERFLOOR STRUCTURE

CROSS-REFERENCE TO RELATED APPLICATION

This application is based on and claims priority under 35 USC 119 from Japanese Patent Application No. 2017-143691 filed on Jul. 25, 2017, the disclosure of which is incorporated by reference herein.

TECHNICAL FIELD

The present disclosure relates to a vehicle underfloor structure.

RELATED ART

Structures in which a battery pack is disposed beneath a floor of a vehicle, and a fuel tank is disposed beneath the floor of the vehicle and at the vehicle body rear side of the battery pack, have conventionally been proposed (see, for example, Japanese Patent Application Laid-Open (JP-A) No. 2014-19260 (Patent Document 1)).

However, when the fuel tank is disposed at the vehicle body rear side of the battery pack, a strong member must be disposed at the vehicle body rear side of the fuel tank in order for collision load to not be inputted to the fuel tank at the time of a rear collision of the vehicle, and there is the concern that the weight of the vehicle will increase. Namely, there is room for improvement in structures that achieve both control of the input of collision load to the fuel tank and lightening of the weight of the vehicle.

SUMMARY

Thus, an object of the present disclosure is to provide a vehicle underfloor structure that can achieve both control of input of collision load to a fuel tank and lightening of the weight of a vehicle.

In order to achieve the above-described object, a vehicle underfloor structure relating to a first aspect includes: a battery pack that is disposed beneath a floor of a vehicle and that is a power source that drives a motor for traveling that is installed in the vehicle; and a fuel tank that is disposed beneath the floor of the vehicle, and between a vehicle body front side end portion and a vehicle body rear side end portion of the battery pack as seen in a side view, between vehicle transverse direction both end portions of the battery pack as seen in a plan view.

In accordance with the first aspect, in side view, the fuel tank is disposed between the vehicle body front side end portion and the vehicle body rear side end portion of the battery pack, and, in plan view, the fuel tank is disposed between the vehicle transverse direction both end portions of the battery pack. Accordingly, at the time of a collision of the vehicle, collision load being inputted to the fuel tank is suppressed by the battery pack. Further, due thereto, a strong member for making it such that collision load is not inputted to the fuel tank is rendered unnecessary, and therefore, the weight of the vehicle can be lightened.

A vehicle underfloor structure relating to a second aspect is the vehicle underfloor structure relating to the first aspect, wherein a height of the fuel tank and a height of the battery pack are substantially the same.

In accordance with the second aspect, the height of the fuel tank and the height of the battery pack are substantially the same. Accordingly, even if collision load is inputted so as to be offset toward the vehicle body upper side of the battery pack, the collision load being inputted to the fuel tank is effectively suppressed as compared with a case in which, for example, the height of the fuel tank is higher than the height of the battery pack.

A vehicle underfloor structure relating to a third aspect is the vehicle underfloor structure relating to the first or second aspect, wherein the battery pack has a notch-shaped portion that opens in a vehicle body longitudinal direction, and the fuel tank is disposed in the notch-shaped portion.

In accordance with the third aspect, the fuel tank is disposed in a notch-shaped portion that is formed in the battery pack and that opens in the vehicle body longitudinal direction. Namely, the both side surfaces of the fuel tank, and the front surface or the rear surface thereof, are disposed so as to face the inner side surfaces that structure the notch-shaped portion of the battery pack. Accordingly, the fuel tank is effectively protected by the battery pack.

A vehicle underfloor structure relating to a fourth aspect is the vehicle underfloor structure relating to the first or second aspect, wherein the battery pack has an opening portion that opens in a vehicle body vertical direction, and the fuel tank is disposed in the opening portion.

In accordance with the fourth aspect, the fuel tank is disposed in the opening portion that is formed in the battery pack and that opens in the vehicle body vertical direction. Namely, the front surface, the rear surface and the both side surfaces of the fuel tank are disposed so as to face the inner side surfaces that structure the opening portion of the battery pack. Accordingly, the fuel tank is more effectively protected by the battery pack.

A vehicle underfloor structure relating to a fifth aspect is the vehicle underfloor structure relating to any one of the first through fourth aspects, wherein the fuel tank is fastened to the battery pack such that the fuel tank and the battery pack form a single unit.

In accordance with the fifth aspect, the fuel tank and the battery pack are formed into a single unit. Accordingly, the assemblability of the fuel tank is improved as compared with a case in which the fuel tank and the battery pack are not formed into a single unit.

A vehicle underfloor structure relating to a sixth aspect is the vehicle underfloor structure relating to any one of the first through fifth aspects, wherein an engine for generating electricity or for driving is installed in a front portion of the vehicle, and concave portions, in which are disposed portions of an exhaust pipe that extends from the engine toward a vehicle body rear side, are formed in a lower portion of the battery pack and a lower portion of the fuel tank.

In accordance with the sixth aspect, the concave portions, in which are disposed portions of the exhaust pipe that extends from the engine toward the vehicle body rear side, are formed in the lower portion of the battery pack and the lower portion of the fuel tank. Accordingly, space for installing the exhaust pipe is ensured efficiently.

In accordance with the invention relating to the first aspect, both control of input of collision load to the fuel tank and lightening of the weight of the vehicle can be achieved.

In accordance with the invention relating to the second aspect, collision load being inputted to the fuel tank can be suppressed effectively.

In accordance with the invention relating to the third aspect, the fuel tank can be effectively protected by the battery pack.

In accordance with the invention relating to the fourth aspect, the fuel tank can be more effectively protected by the battery pack.

In accordance with the invention relating to the fifth aspect, the assemblability of the fuel tank can be improved.

In accordance with the invention relating to the sixth aspect, space for installing the exhaust pipe can be ensured efficiently.

DETAILED DESCRIPTION

Embodiments relating to the present disclosure are described in detail hereinafter on the basis of the drawings. Note that, for convenience of explanation, arrow UP that is shown appropriately in the respective drawings is the vehicle body upward direction, arrow FR is the vehicle body forward direction, and arrow RH is the vehicle body rightward direction. Further, in the following description, when vertical, longitudinal, and left-right directions are used, they refer to the vertical of the vehicle body vertical direction, the longitudinal of the vehicle body longitudinal direction, and the left and right of the vehicle body left-right direction (the vehicle transverse direction), unless otherwise indicated.

First Embodiment

Figure 1:
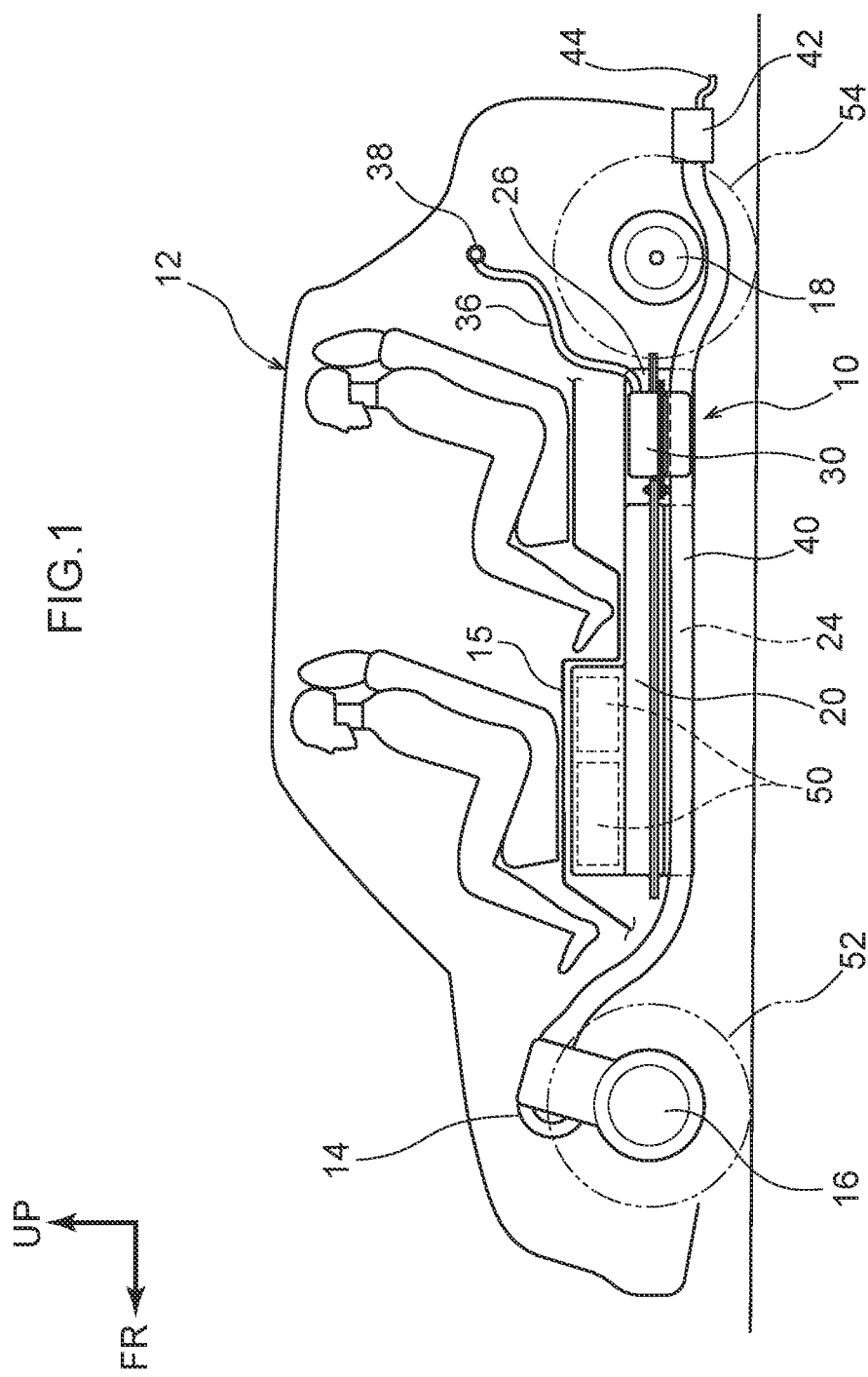
FIG. 1 is a side view showing a vehicle that is equipped with a vehicle underfloor structure relating to a first embodiment.
Figure 2:
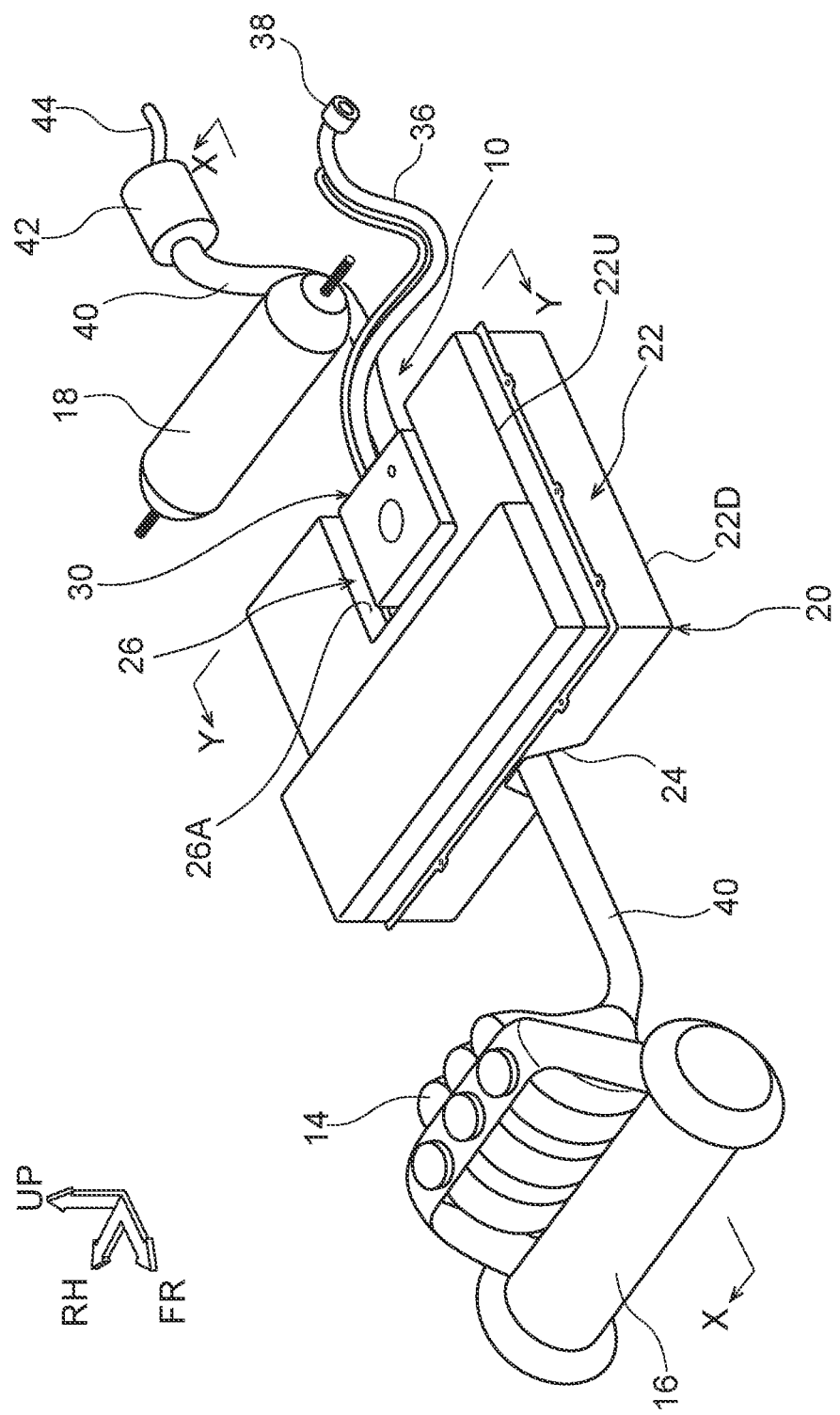
FIG. 2 is a perspective view in which the vehicle underfloor structure relating to the first embodiment is seen from an obliquely upper side.
Figure 3:
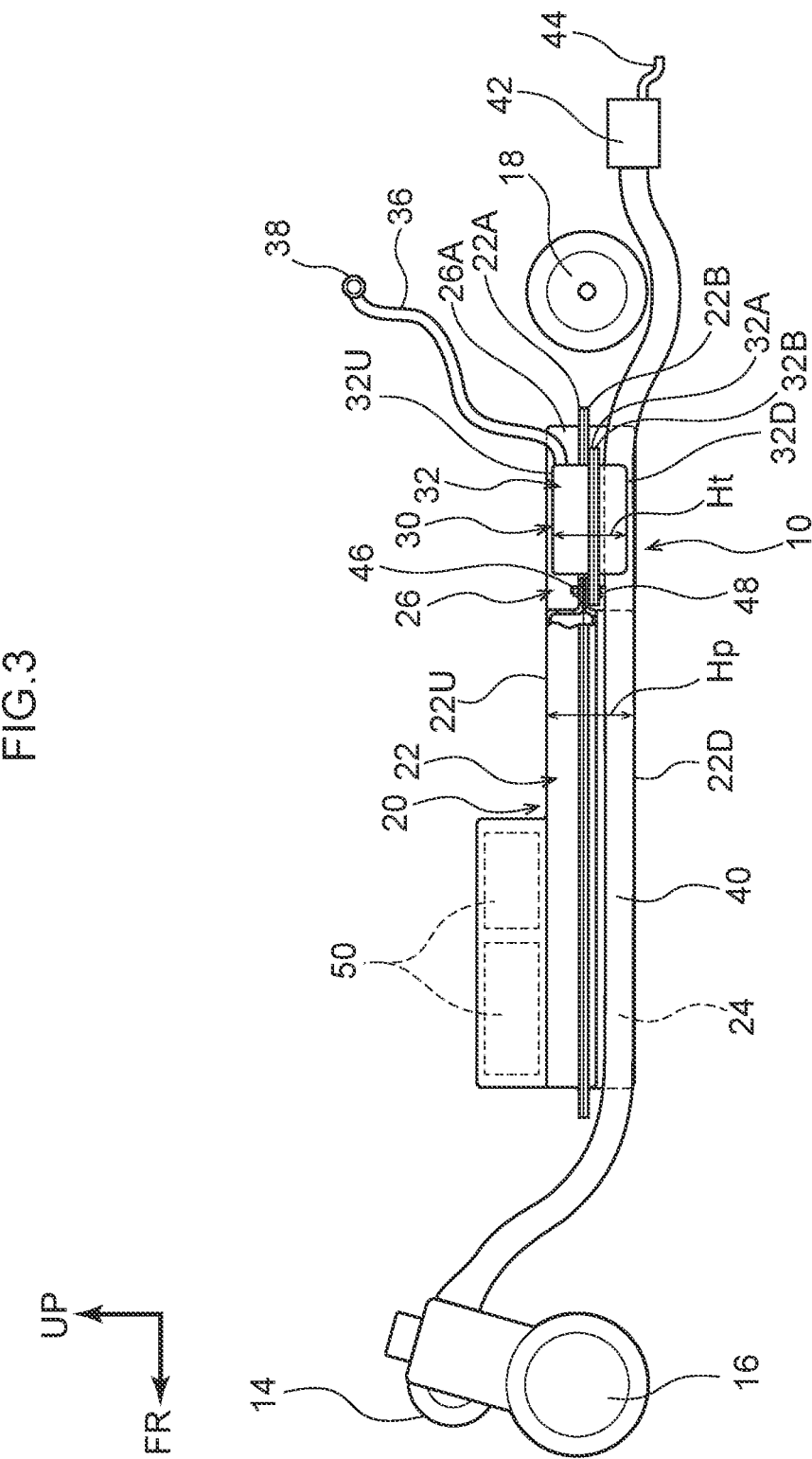
FIG. 3 is a schematic side view seen in the direction of the X-X arrow line of FIG. 2.

A vehicle underfloor structure 10 relating to a first embodiment is described first. As shown in FIG. 1 through FIG. 3, an engine 14 for generating electricity is installed in the front portion of a vehicle 12. A motor 16 for generating electricity is installed at the vehicle body lower side of the engine 14, and, specifically, between left and right front wheels 52. A motor 18 for traveling which is used to drive the rear wheels is installed in the rear portion of the vehicle 12, and, specifically, between left and right rear wheels 54.

The electricity generated by the engine 14 for generating electricity and the motor 16 for generating electricity is stored in a battery pack 20 that is described later. The battery pack 20 is the power source that drives the motor 18 for travelling. Namely, the vehicle 12 is a range extender vehicle that can travel a long distance by electricity.

Figure 5:
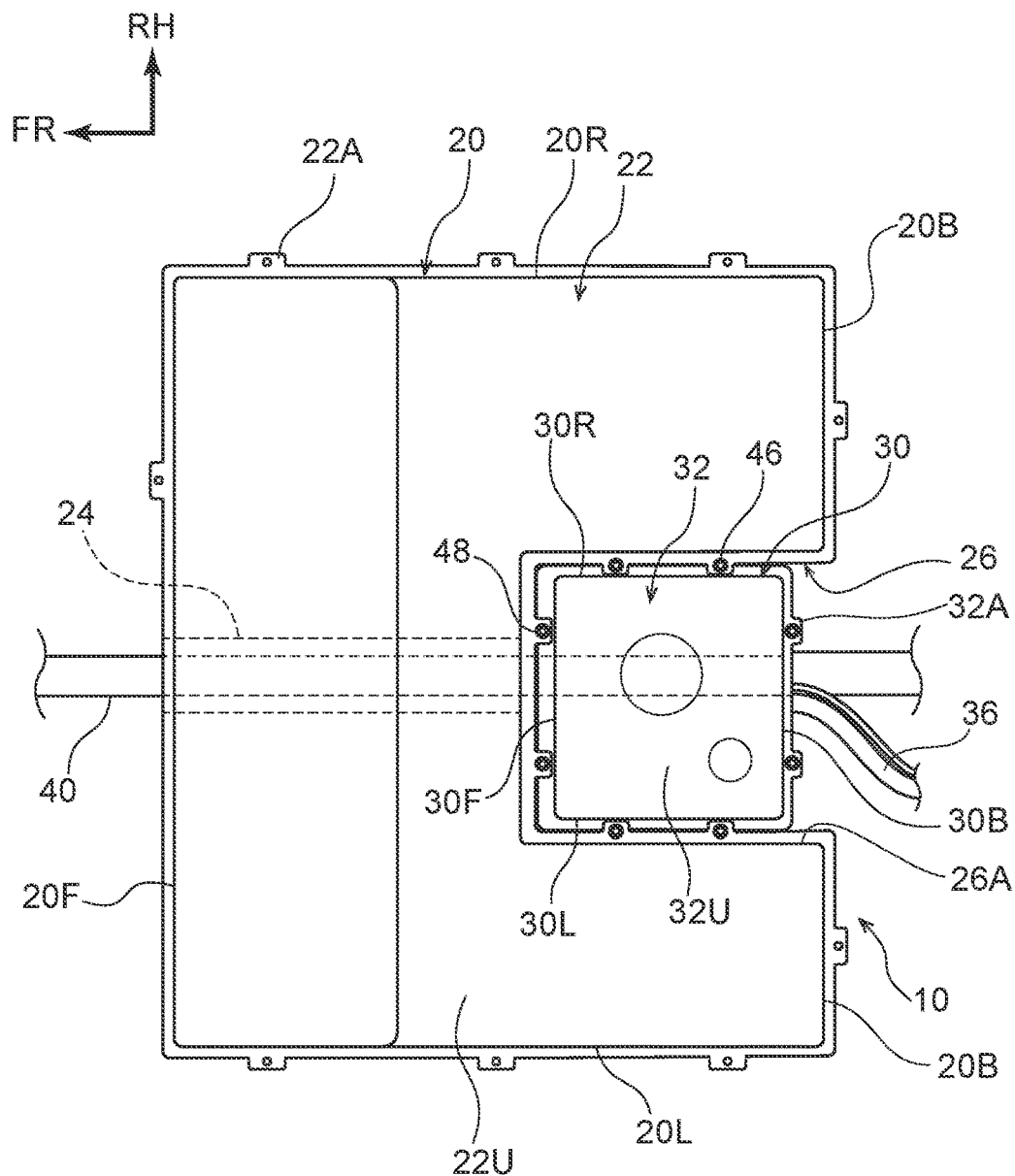
FIG. 5 is a plan view showing a battery pack and a fuel tank relating to the first embodiment.

The battery pack 20 and a fuel tank 30 are disposed between the motor 16 for generating electricity and the motor 18 for traveling, and at the vehicle body lower side of a floor panel 15 (see FIG. 1) that structures the floor of the vehicle 12. As shown in FIG. 2 and FIG. 5, the battery pack 20 is structured such that many battery cells 21 (see FIG. 21) are accommodated at the interior of an outer case 22 that is made of metal (e.g., is made of iron or is made of an aluminum alloy) and that is formed in a substantial U-shape as seen in a plan view.

Figure 4:
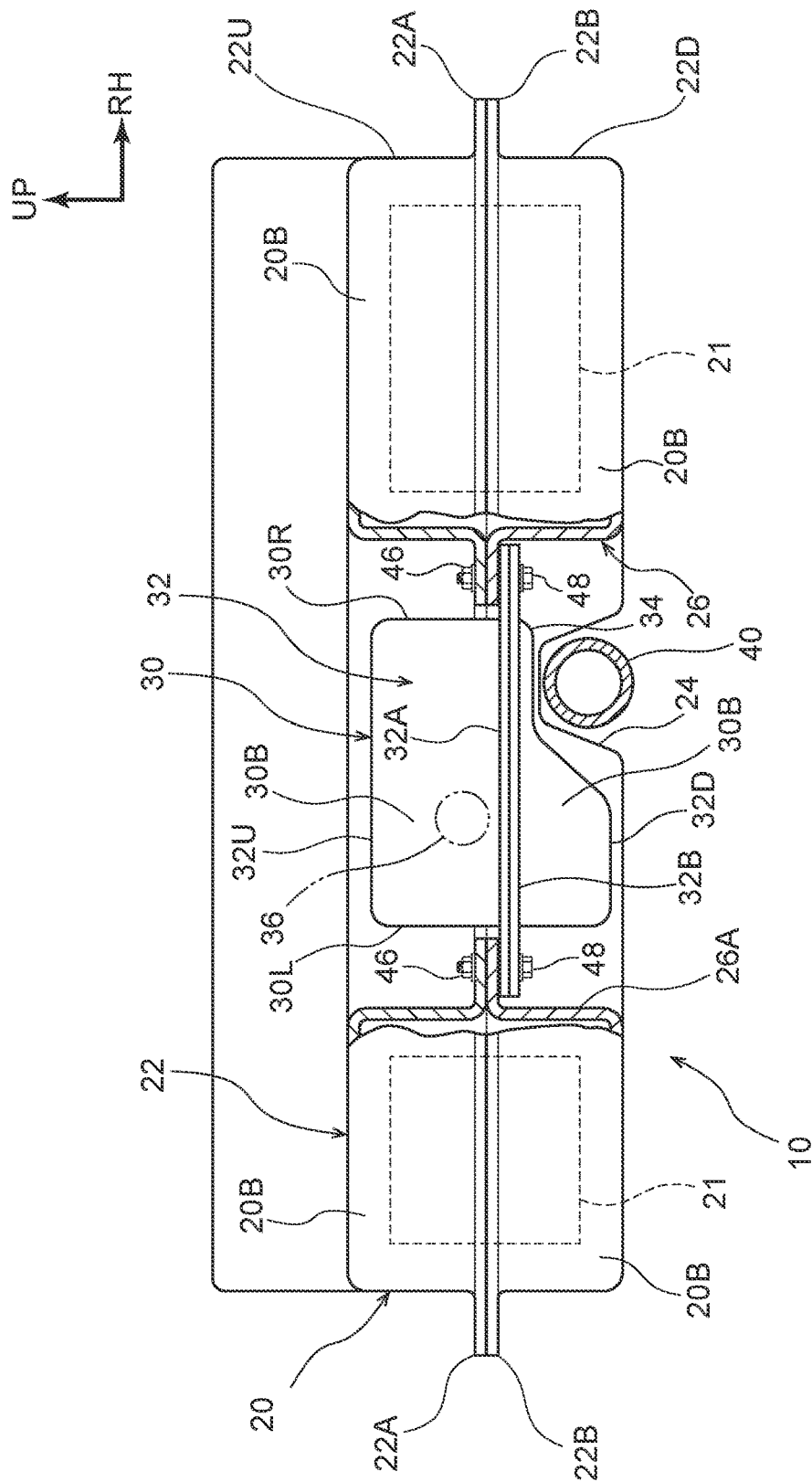
FIG. 4 is a schematic front view seen in the direction of the Y-Y arrow line of FIG. 2.

As shown in FIG. 3 through FIG. 5, the outer case 22 has an upper case 22U, whose side walls stand erect integrally with the peripheral edge portion of a ceiling plate that is substantially U-shaped as seen in plan view, and a lower case 22D, whose side walls stand erect integrally with the peripheral edge portion of a bottom plate that is substantially U-shaped as seen in a bottom view. A flange portion 22A that juts-out toward the outer side is formed integrally with the lower end portions of the side walls of the upper case 22U. A flange portion 22B that juts-out toward the outer side is formed integrally with the upper end portions of the side walls of the lower case 22D.

Accordingly, the outer case 22 is structured by the flange portion 22A, which is formed at the side walls of the upper case 22U, and the flange portion 22B, which is formed at the side walls of the lower case 22D, being joined together. Due thereto, a notch-shaped portion 26, which is substantially rectangular as seen in a plan view and which opens toward the vehicle body rear side, is formed in the rear portion of the outer case 22 at slightly further toward the left side (a vehicle transverse direction one end side) than the vehicle transverse direction central portion of the rear portion of the outer case 22 (hereinafter called "rear portion center"). Note that, in the following description, the wall surfaces of the side walls that structure the notch-shaped portion 26 are called "inner side surfaces 26A".

Further, as shown in FIG. 1 through FIG. 3, a concave portion 24, whose cross-section is substantially isosceles trapezoidal and that is for placement (passage) of a portion of an exhaust pipe 40 that extends from the engine 14 toward the vehicle body rear side, is formed in the vehicle transverse direction substantially central portion of the lower portion of the battery pack 20 (the bottom plate and the lower portions of side walls of the lower case 22D). Namely, this concave portion 24 extends in the vehicle body longitudinal direction along the exhaust pipe 40, and is structured so as to accommodate at least the upper half of the exhaust pipe 40 in order to suppress projecting-out of the exhaust pipe 40 toward the vehicle body lower side from the bottom surface of the battery pack 20.

Figure 6:
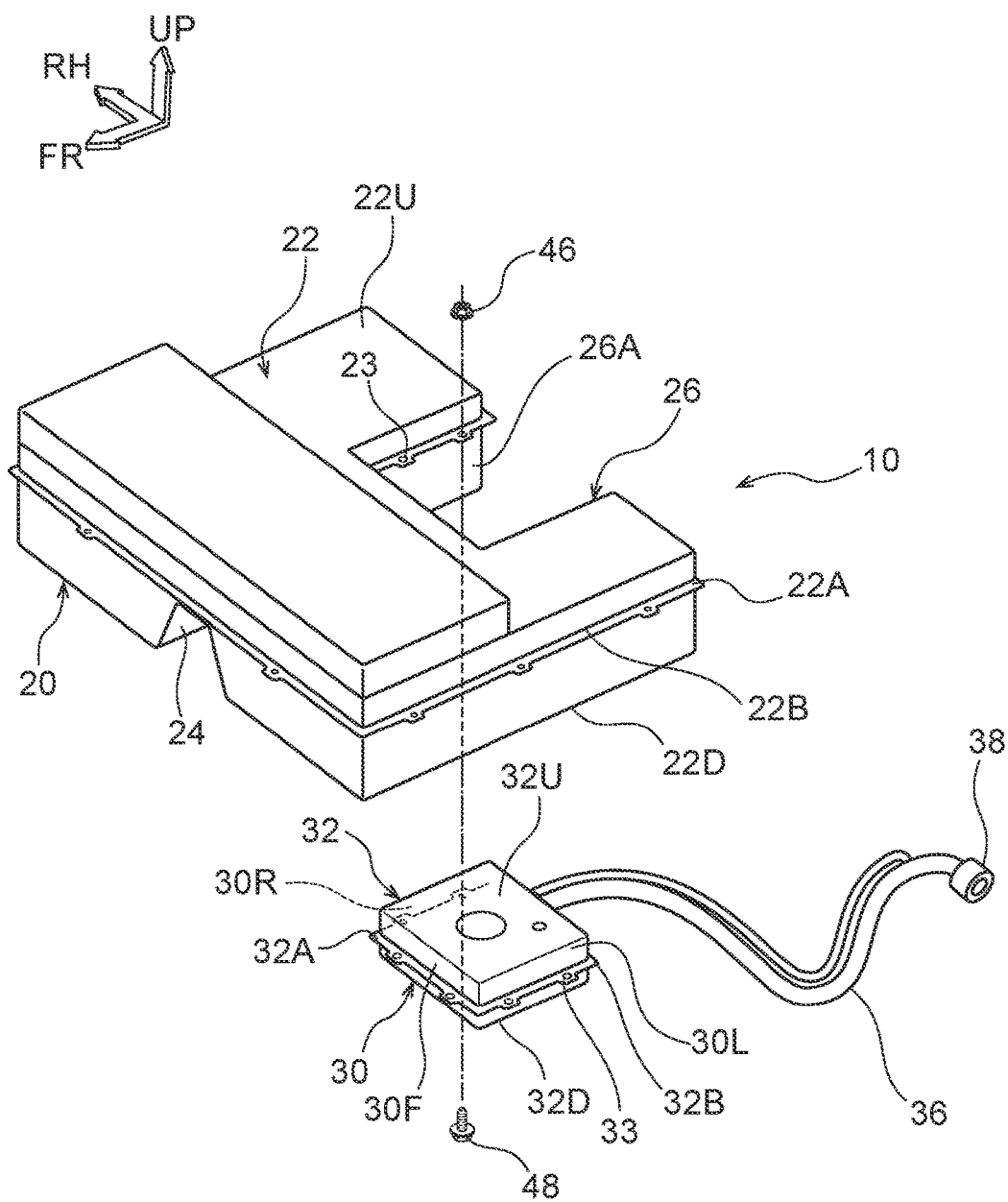
FIG. 6 is a perspective view showing the battery pack and the fuel tank relating to the first embodiment.

Further, as shown in FIG. 6, plural through-holes 23, which are for the fastening of bolts and which communicate with one another, are formed in the flange portions 22A, 22B at the inner side surfaces 26A that structure the notch-shaped portion 26 of the battery pack 20. Plural weld nuts 46 are fixed, coaxially with the respective through-holes 23, to the top surface of the flange portion 22A of the upper case 22U. Note that, in FIG. 6, the weld nut 46 is drawn as if apart from the flange portion 22A, in order to illustrate the through-hole 23. Further, as shown in FIG. 1 and FIG. 3, auxiliary equipment 50 is provided integrally with the top surface of the front portion of the battery pack 20.

As shown in FIG. 5, the fuel tank 30 has a tank main body 32 that is made of resin (e.g., is made of high-density polyethylene) and that is substantially the same rectangular shape as the notch-shaped portion 26 as seen in plan view, and, more exactly, is a substantially rectangular shape whose length in the vehicle body longitudinal direction is slightly shorter than that of the notch-shaped portion 26 as seen in plan view. Note that gasoline that serves as fuel and is supplied to the engine 14 is stored in the interior of the tank main body 32.

Further, as shown in FIG. 3 through FIG. 5, the tank main body 32 has an upper tank 32U, whose side walls stand erect integrally with the peripheral edge portion of a ceiling plate that is substantially rectangular as seen in plan view, and a lower tank 32D, whose side walls stand erect integrally with the peripheral edge portion of a bottom plate that is substantially rectangular as seen in bottom view. Further, a flange portion 32A that juts-out toward the outer side is formed integrally with the lower end portions of the side walls of the upper tank 32U. A flange portion 32B that juts-out toward the outer side is formed integrally with the upper end portions of the side walls of the lower tank 32D.

Accordingly, the tank main body 32 is structured by the flange portion 32A, which is formed at the side walls of the upper tank 32U, and the flange portion 32B, which is formed at the side walls of the lower tank 32D, being joined together. Further, the fuel tank 30 is disposed so as to fit-together with the notch-shaped portion 26 that is formed slightly further toward the left side than the rear portion center of the battery pack 20. A rear surface 30B of the fuel tank 30 does not project-out further toward the vehicle body rear side than a rear surface 20B of the battery pack 20 (see FIG. 5).

In other words, a front surface 30F, which serves as the vehicle body front side end portion of the fuel tank 30, and the rear surface 30B, which serves as the vehicle body rear side end portion of the fuel tank 30, are, as seen in side view, disposed between a front surface 20F, which serves as the vehicle body front side end portion of the battery pack 20, and the rear surface 20B which serves as the vehicle body rear side end portion of the battery pack 20. Further, a right side surface 30R and a left side surface 30L, which serve as vehicle transverse direction both end portions of the fuel tank 30, are, as seen in plan view, disposed between a right side surface 20R and a left side surface 20L which serve as vehicle transverse direction both end portions of the battery pack 20 (i.e., the right side surface 30R and the left side surface 30L are disposed further toward the vehicle transverse direction inner side than the right side surface 20R and the left side surface 20L) (see FIG. 5).

Further, as shown in FIG. 6, plural through-holes 33, which are for the fastening of bolts and which communicate with one another, are formed in the flange portions 32A, 32B at the front surface 30F, the right side surface 30R and the left side surface 30L of the fuel tank 30. Further, as shown in FIG. 3 and FIG. 4, the flange portion 32A at the upper tank 32U is superposed, from the vehicle body lower side, with the flange portion 22B that is at the inner side surfaces 26A that structure the notch-shaped portion 26.

Namely, the fuel tank 30 is fastened integrally to the battery pack 20 due to the fuel tank 30 being placed so as to fit-together with the notch-shaped portion 26 of the battery pack 20 from the vehicle body lower side, and bolts 48 being inserted from the vehicle body lower side into the through-holes 33, 23 that communicate with one another, and the bolts 48 being screwed-together with the weld nuts 46. Due thereto, the battery pack 20 and the fuel tank 30 are made into a module (are formed as a single unit).

Further, as shown in FIG. 4, a concave portion 34, which is shaped as a step and is for the placement (passage) of the exhaust pipe 40 that extends from the engine 14 toward the vehicle body rear side, is formed in the right side (a vehicle transverse direction another end side) at the lower portion of the fuel tank 30 (the bottom plate of the lower tank 32D). Namely, this concave portion 34 extends in the vehicle body longitudinal direction along the exhaust pipe 40, and is structured so as to, together with the concave portion 24, accommodate at least the upper half of the exhaust pipe 40 in order to suppress projecting-out of the exhaust pipe 40 toward the vehicle body lower side from the bottom surface of the fuel tank 30.

Moreover, as shown in FIG. 3 and FIG. 4, height Ht (see FIG. 3) of the fuel tank 30 is substantially the same as (more accurately, is the same is or is lower than) height Hp (see FIG. 3) of the rear portion side of the battery pack 20 (the portion further toward the vehicle body rear side than the auxiliary equipment 50). Namely, the fuel tank 30 does not project out toward the vehicle body lower side from the bottom surface of the rear portion of the battery pack 20, and does not project-out toward the vehicle body upper side from the top surface of the rear portion of the battery pack 20.

Further, as shown in FIG. 1 through FIG. 3, a fuel supply port 38 for supplying gasoline to the fuel tank 30 is provided at the rear portion of the left side portion (one side portion) of the vehicle 12. The fuel tank 30 and the fuel supply port 38 communicate and are connected by an inlet pipe 36. Concretely, the lower end portion (one end portion) of the inlet pipe 36 communicates with and is connected to the rear surface 30B of the fuel tank 30 (the upper tank 32U), and the upper end portion (another end portion) of the inlet pipe 36 communicates with and is connected to the fuel supply port 38.

Further, as described above, the exhaust pipe 40 is laid from the vehicle transverse direction substantially central portion of the engine 14 toward the vehicle body rear side. The exhaust pipe 40 is laid so as to pass-through the vehicle transverse direction substantially central portion of the vehicle 12. The exhaust pipe 40, which extends further toward the vehicle body rear side than the fuel tank 30, is laid so as to avoid the motor 18 for traveling, i.e., so as to pass along the vehicle body lower side of the motor 18 for traveling, and communicates with and is connected to a muffler 42.

The muffler 42 is formed substantially in the shape of a cylinder whose axial direction is the vehicle body longitudinal direction. The exhaust pipe 40 communicates with and is connected to the vehicle transverse direction substantially central portion of the front wall of the muffler 42. Further, a muffler cutter 44 extends from the lower portion side of the rear wall of the muffler 42 toward the vehicle body rear side.

Operation of the vehicle underfloor structure 10, which relates to the first embodiment and is structured as described above, is described next.

As described above, the fuel tank 30 is provided within the notch-shaped portion 26 of the battery pack 20. More concretely, the front surface 30F, the right side surface 30R and the left side surface 30L of the fuel tank 30 are disposed so as to face the inner side surfaces 26A that structure the notch-shaped portion 26. As seen in a side view, the front surface 30F and the rear surface 30B of the fuel tank 30 are disposed between the front surface 20F and the rear surface 20B of the battery pack 20. As seen in a plan view, the right side surface 30R and the left side surface 30L of the fuel tank 30 are disposed between the right side surface 20R and the left side surface 20L of the battery pack 20.

Accordingly, the fuel tank 30 is effectively protected by the battery pack 20. Of course at times of a front collision and at times of a side collision of the vehicle 12, but also at times of a rear collision, the collision load thereof being inputted to the rear surface 30B of the fuel tank 30 can be suppressed or prevented by the battery pack 20. Accordingly, at the time of a collision of the vehicle 12 (the time of a front collision, the time of a side collision, and the time of a rear collision), the occurrence of problems such as the fuel tank 30 being damaged can be suppressed or prevented.

Further, this obviates (renders unnecessary) the need to provide, at the rear portion side of the vehicle 12, a strong member for making it such that collision load is not inputted to the rear surface 30B of the fuel tank, and therefore, the weight of the vehicle 12 can be lightened. Further, because such a strong member is not needed, application even to types of vehicles at which the length of the rear portion side is short is possible, and the number of variations on the vehicle 12 to which the vehicle underfloor structure 10 relating to the present embodiment can be applied can be increased. Namely, mass production of the vehicle 12 is possible, and the manufacturing costs can be reduced effectively.

Further, the height Ht of the fuel tank 30 is substantially the same as the height Hp of the rear portion side of the battery pack 20. Therefore, at the time of a front collision, at the time of a side collision and at the time of a rear collision of the vehicle 12, even if the collision load is inputted so as to be offset further toward the vehicle body upper side than top surface of the rear portion of the battery pack 20, the collision load being inputted to the fuel tank 30 can be effectively suppressed or prevented as compared with a case in which, for example, the height Ht of the fuel tank 30 is higher than the height Hp of the rear portion side of the battery pack 20 (a case in which the upper portion of the fuel tank 30 projects-out toward the vehicle body upper side from the top surface of the rear portion of the battery pack 20).

Further, as described above, the fuel tank 30 is provided within the notch-shaped portion 26 of the battery pack 20, and is made into a single unit with (made into a module with) the battery pack 20. Accordingly, the assemblability of the fuel tank 30 can be improved as compared with a case in which the fuel tank 30 is not made into a single unit (is not made into a module) with the battery pack 20.

Further, the fuel tank 30 is disposed so as to fit-together with the notch-shaped portion 26 of the battery pack 20 from the vehicle body lower side, and the flange portions 32A, 32B of the fuel tank 30 are fastened to the flange portions 22A, 22B of the battery pack 20 by the bolts 48 and the weld nuts 46. Accordingly, when the fuel tank 30 is to be replaced for example, the fuel tank 30 can be removed without removing the battery pack 20 which is a heavy object. Namely, with such a structure, the work of replacing the fuel tank 30 can be facilitated.

Moreover, the concave portions 24, 34, in which are disposed portions of the exhaust pipe 40 that extends from the engine 14 toward the vehicle body rear side, are formed in the lower portion of the battery pack 20 and the lower portion (the bottom surface) of the fuel tank 30, respectively. Accordingly, for example, even at the vehicle 12 whose vehicle height is low, space for installation of the exhaust pipe 40 can be ensured efficiently.

Further, because the exhaust pipe 40 is laid at the vehicle body lower sides of the battery pack 20 and the fuel tank 30, the inlet pipe 36 can be disposed so as to be apart from the exhaust pipe 40. Due thereto, heat damage to the inlet pipe 36 that is caused by the exhaust pipe 40 can be reduced.

Further, the battery pack 20 that is a heavy object is disposed between the axle of the front wheels 52 and the axle of the rear wheels 54 as seen in a side view, and at the vehicle body lower side of the floor panel 15. Therefore, the allocation of load at the front portion side and the rear portion side of the vehicle 12 can be optimized, and the vehicle 12 can be made to have a low center of gravity. Accordingly, the driving performance of the vehicle 12 can be improved.

Further, the battery pack 20 is disposed at the vehicle body lower side of the floor panel 15 which can relatively broadly be interpreted as the installation space of the battery pack 20. Therefore, the installation capacity of the battery pack 20 can be increased. Moreover, because the battery pack 20 and the fuel tank 30 are disposed at the vehicle body lower side of the floor panel 15, there is the advantage that the design of the portion of the body that is further toward the vehicle body upper side than that is not constrained.

Second Embodiment

The vehicle underfloor structure 10 relating to a second embodiment is described next. Note that regions that are equivalent to those of the above-described first embodiment are denoted by the same reference numerals, and detailed description thereof (including description of operation that is common thereto) is omitted as appropriate.

Figure 7:
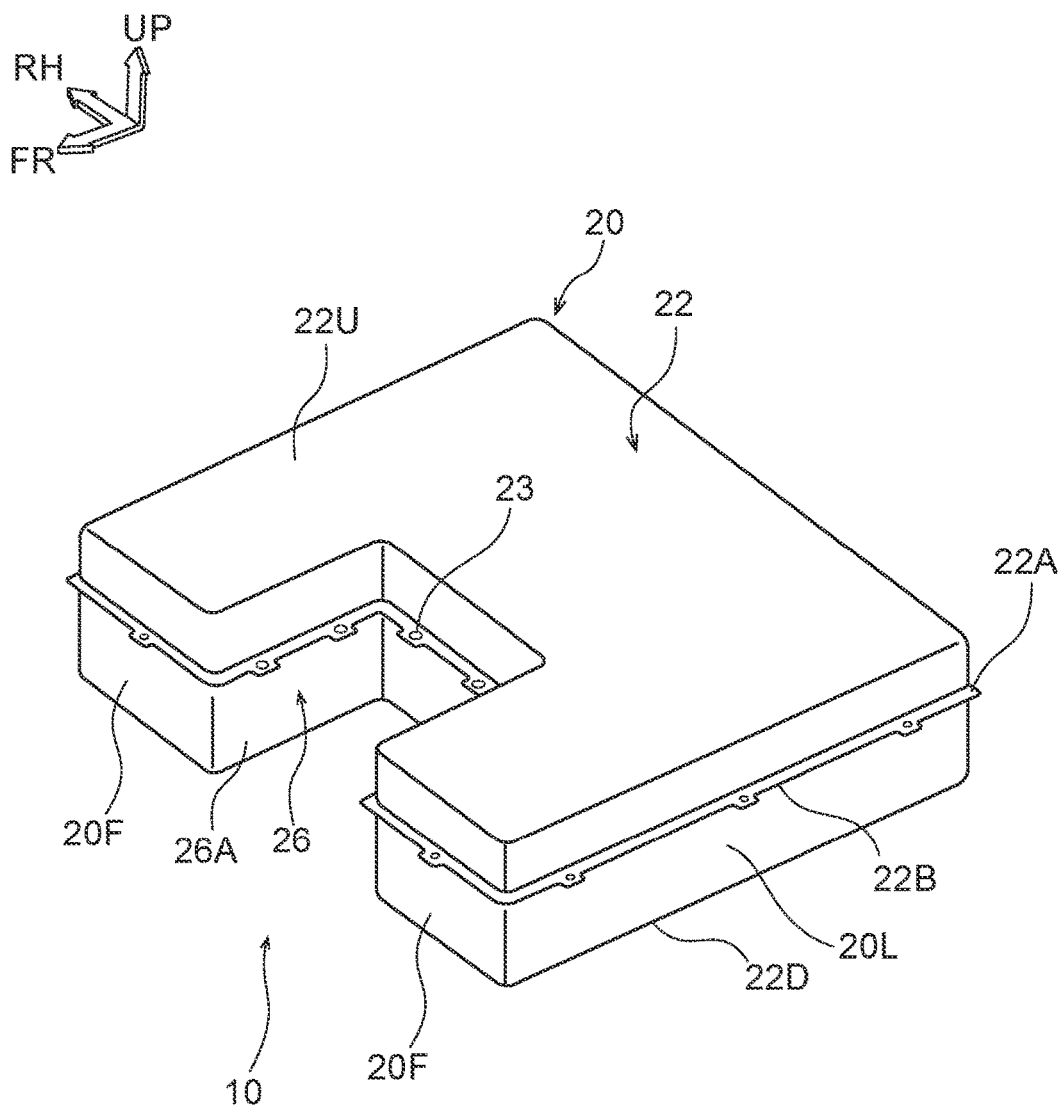
FIG. 7 is a perspective view showing a battery pack relating to a second embodiment.

As shown in FIG. 7, in the vehicle underfloor structure 10 relating to the second embodiment, the notch-shaped portion 26 is not formed at the rear portion side of the battery pack 20, and the notch-shaped portion 26, which is substantially rectangular as seen in plan view and which opens toward the vehicle body front side, is formed in the front portion of the battery pack 20 slightly further toward the left side than the vehicle transverse direction central portion (hereinafter called "front portion center") at the front portion of the battery pack 20.

Namely, the fuel tank 30 that is shown in FIG. 1 through FIG. 6 is provided within the notch-shaped portion 26 that is formed slightly further toward the left side than the front portion center of the battery pack 20. In the same way as described above, the exhaust pipe 40 can be disposed (can be made to pass-through) owing to the concave portion 34, and the front surface 30F of the fuel tank 30 does not project-out further toward the vehicle body front side than the front surface 20F of the battery pack 20.

More concretely, the rear surface 30B, the right side surface 30R and the left side surface 30L of the fuel tank 30 are disposed so as to face the inner side surfaces 26A that structure the notch-shaped portion 26 of the battery pack 20. As seen in a side view, the front surface 30F and the rear surface 30B of the fuel tank 30 are disposed between the front surface 20F and the rear surface 20B of the battery pack 20, and, as seen in a plan view, the right side surface 30R and the left side surface 30L of the fuel tank 30 are disposed between the right side surface 20R and the left side surface 20L of the battery pack 20.

Accordingly, the fuel tank 30 is effectively protected by the battery pack 20. Of course at times of a rear collision and at times of a side collision of the vehicle 12, but also at times of a front collision, the collision load thereof being inputted to the front surface 30F of the fuel tank 30 can be suppressed or prevented by the battery pack 20. Accordingly, at the time of a collision of the vehicle 12 (the time of a front collision, the time of a side collision, and the time of a rear collision), the occurrence of problems such as the fuel tank 30 being damaged can be suppressed or prevented.

Third Embodiment

Finally, the vehicle underfloor structure 10 relating to a third embodiment is described. Note that regions that are equivalent to those of the above-described first embodiment and second embodiment are denoted by the same reference numerals, and detailed description thereof (including description of operation that is common thereto) is omitted as appropriate.

Figure 8:
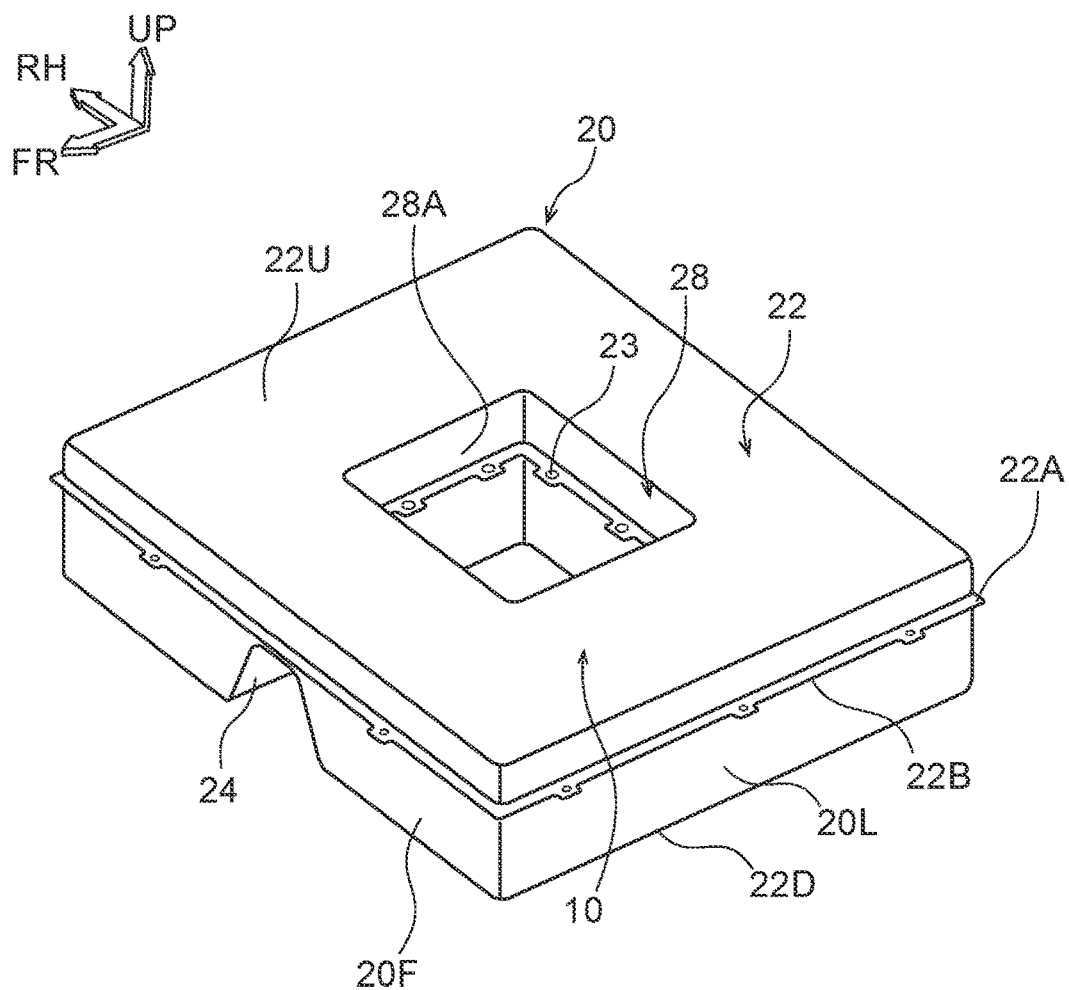
FIG. 8 is a perspective view showing a battery pack relating to a third embodiment.

As shown in FIG. 8, in the vehicle underfloor structure 10 relating to the third embodiment, the notch-shaped portion 26 is not formed at the rear portion side or the front portion side of the battery pack 20. An opening portion 28, which, as seen in plan view, is formed substantially in the shape of a rectangle of approximately the same size as the fuel tank 30 and opens in the vehicle body vertical direction, is formed in the vehicle body longitudinal direction central portion of the battery pack 20 slightly further toward the left side than the vehicle transverse direction central portion thereof.

Namely, the fuel tank 30 that is shown in FIG. 1 through FIG. 6 is provided within the opening portion 28 that is formed in the vehicle body longitudinal direction central portion of the battery pack 20 slightly further toward the left side than the vehicle transverse direction central portion. In the same way as described above, the exhaust pipe 40 can be disposed (can be made to pass-through) owing to the concave portion 34, and the front surface 30F and the rear surface 30B of the fuel tank 30 do not project-out further toward the vehicle body front side and the vehicle body rear side than the front surface 20F and the rear surface 20B of the battery pack 20.

More concretely, the front surface 30F, the rear surface 30B, the right side surface 30R and the left side surface 30L of the fuel tank 30 are disposed so as to face inner side surfaces 28A that structure the opening portion 28 of the battery pack 20. As seen in a side view, the front surface 30F and the rear surface 30B of the fuel tank 30 are disposed between the front surface 20F and the rear surface 20B of the battery pack 20, and, as seen in a plan view, the right side surface 30R and the left side surface 30L of the fuel tank 30 are disposed between the right side surface 20R and the left side surface 20L of the battery pack 20.

Accordingly, the fuel tank 30 is effectively protected by the battery pack 20. At times of a front collision, at times of a side collision and at times of a rear collision of the vehicle 12, the collision load thereof being inputted to the front surface 30F, the respective side surfaces 30R, 30L and the rear surface 30B of the fuel tank 30 can be suppressed or prevented by the battery pack 20. Accordingly, at the time of a collision of the vehicle 12 (the time of a front collision, the time of a side collision, and the time of a rear collision), the occurrence of problems such as the fuel tank 30 being damaged can be suppressed or prevented.

The vehicle underfloor structures 10 relating to the embodiments have been described above on the basis of the drawings, but the vehicle underfloor structures 10 relating to the embodiments are not limited to the illustrated structures, and the designs thereof can be changed appropriately within a scope that does not depart from the gist of the present disclosure. For example, the height of the fuel tank 30 and the height of the battery pack 20 do not have to be substantially the same.

Further, a concave portion (not illustrated), whose cross-section is substantially isosceles trapezoidal in the same way as the concave portion 24, may be formed in the vehicle transverse direction substantially central portion of the lower portion of the fuel tank 30. In this case, it suffices for the notch-shaped portion 26 or the opening portion 28 to be formed in the vehicle transverse direction central portion of the battery pack 20 (the notch-shaped portion 26 or the opening portion 28 does not have to be formed so as to be offset toward the left side from the vehicle transverse direction central portion). Further, the shape of the concave portion 24 is not limited to the illustrated shape of substantially isosceles trapezoidal in cross-section, and, for example, may be formed in the shape of a substantially semicircular arc in cross-section, or the like.

Further, the concave portions 24, 34 do not have to be formed in the lower portion of the battery pack 20 and the lower portion of the fuel tank 30, respectively. Further, the engine 14 may be for driving and not for generating electricity. Namely, the vehicle 12 to which the vehicle underfloor structures 10 relating to the embodiments are applied may be a plug-in hybrid vehicle.

Moreover, the fuel tank 30 does not have to be fastened to the battery pack 20 (the fuel tank 30 and the battery pack 20 do not have to be made into a module). For example, in the first embodiment and the second embodiment, instead of being formed in a substantial U-shape as seen in plan view, the battery pack 20 may be a structure that is divided into a front side portion, a left side portion and a right side portion, and the fuel tank 30 does not have to be fastened to these.

What is claimed is:

1. A vehicle underfloor structure comprising:
   a battery pack that is disposed beneath a floor of a vehicle and that is a power source that drives a motor for traveling installed in the vehicle; and
   a fuel tank that is disposed beneath the floor of the vehicle, between a vehicle body front side end portion and a vehicle body rear side end portion of the battery pack as seen in a side view, and between vehicle transverse direction both end portions of the battery pack as seen in a plan view.

2. The vehicle underfloor structure of claim 1, wherein a height of the fuel tank and a height of the battery pack are substantially the same.

3. The vehicle underfloor structure of claim 2, wherein
   the battery pack has a notch-shaped portion that opens in a vehicle body longitudinal direction, and
   the fuel tank is disposed in the notch-shaped portion.

4. The vehicle underfloor structure of claim 2, wherein
   the battery pack has an opening portion that opens in a vehicle body vertical direction, and
   the fuel tank is disposed in the opening portion.

5. The vehicle underfloor structure of claim 2, wherein the fuel tank is fastened to the battery pack such that the fuel tank and the battery pack form a single unit.

6. The vehicle underfloor structure of claim 2, wherein
   an engine for generating electricity or for driving is installed in a front portion of the vehicle, and
   concave portions, in which are disposed portions of an exhaust pipe that extends from the engine toward a vehicle body rear side, are formed in a lower portion of the battery pack and a lower portion of the fuel tank.

7. The vehicle underfloor structure of claim 1, wherein
   the battery pack has a notch-shaped portion that opens in a vehicle body longitudinal direction, and
   the fuel tank is disposed in the notch-shaped portion.

8. The vehicle underfloor structure of claim 7, wherein the fuel tank is fastened to the battery pack such that the fuel tank and the battery pack form a single unit.

9. The vehicle underfloor structure of claim 7, wherein
   an engine for generating electricity or for driving is installed in a front portion of the vehicle, and
   concave portions, in which are disposed portions of an exhaust pipe that extends from the engine toward a vehicle body rear side, are formed in a lower portion of the battery pack and a lower portion of the fuel tank.

10. The vehicle underfloor structure of claim 1, wherein
the battery pack has an opening portion that opens in a vehicle body vertical direction, and
the fuel tank is disposed in the opening portion.

11. The vehicle underfloor structure of claim 10, wherein the fuel tank is fastened to the battery pack such that the fuel tank and the battery pack form a single unit.

12. The vehicle underfloor structure of claim 10, wherein
an engine for generating electricity or for driving is installed in a front portion of the vehicle, and
concave portions, in which are disposed portions of an exhaust pipe that extends from the engine toward a vehicle body rear side, are formed in a lower portion of the battery pack and a lower portion of the fuel tank.

13. The vehicle underfloor structure of claim 1, wherein the fuel tank is fastened to the battery pack such that the fuel tank and the battery pack form a single unit.

14. The vehicle underfloor structure of claim 1, wherein
an engine for generating electricity or for driving is installed in a front portion of the vehicle, and
concave portions, in which are disposed portions of an exhaust pipe that extends from the engine toward a vehicle body rear side, are formed in a lower portion of the battery pack and a lower portion of the fuel tank.

* * * * *